Figure 1:
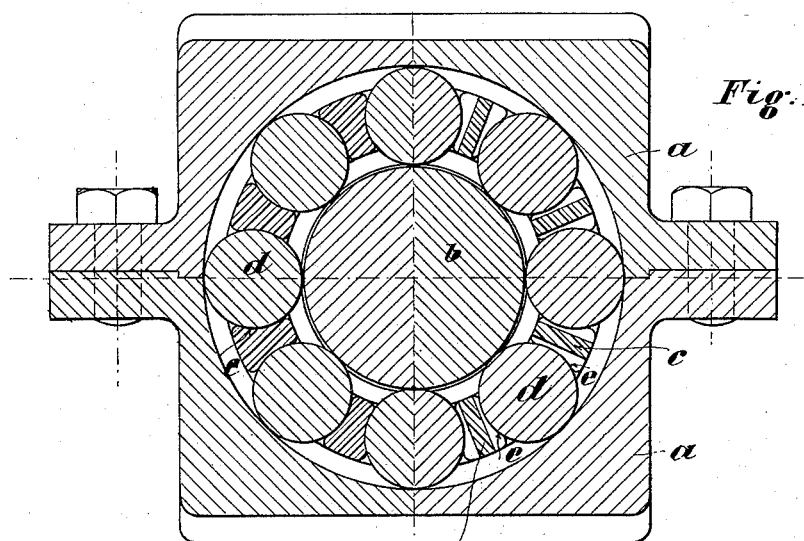

No. 612,472.  
Patented Oct. 18, 1898.

W. H. WOODCOCK.
ROLLER BEARING.
(Application filed Dec. 20, 1897.)

(No Model.)  
3 Sheets—Sheet 1.

Witnesses:  
Arthur Woodman  
William J. Thorn

Inventor:  
William H. Woodcock  
per Ino. J. Darnell  
Attorney.

No. 612,472. Patented Oct. 18, 1898.
W. H. WOODCOCK.
ROLLER BEARING.
(Application filed Dec. 20, 1897.)
(No Model.) 3 Sheets—Sheet 2.

Witnesses:
Arthur Woodman
William J. Thom

Inventor:
William Hugh Woodcock
per John D. O'Donnell
Attorney.

No. 612,472. Patented Oct. 18, 1898.
W. H. WOODCOCK.
ROLLER BEARING.
(Application filed Dec. 20, 1897.)

(No Model.) 3 Sheets—Sheet 3.

Witnesses:—
Arthur Woodman
William Thom

Inventor
William Hugh Woodcock
per John D. O'Donnell
Attorney.

THE NORRIS PETERS CO., PHOTO-LITHO., WASHINGTON, D. C.

UNITED STATES PATENT OFFICE.

WILLIAM HUGH WOODCOCK, OF LONDON, ENGLAND.

ROLLER-BEARING.

SPECIFICATION forming part of Letters Patent No. 612,472, dated October 18, 1898.

Application filed December 20, 1897. Serial No. 662,676. (No model.)

*To all whom it may concern:*

Be it known that I, WILLIAM HUGH WOODCOCK, a subject of the Queen of Great Britain and Ireland, residing at 25 Auckland Hill, West Norwood, London, in the county of Surrey, England, have invented a new and useful Improvement in and Connected with Roller-Bearings, of which the following is a specification.

This invention has reference to improvements in roller-bearings for diminishing friction between revolving journals or shafts and their bearings and between wheels or pulleys revolving on fixed journals or shafts; and it relates particularly to improvements in the cages or cradles employed for separating the rollers and retaining them in their proper relative circumferential and parallel positions.

I will first describe my improved form of cage whereby the machining of the surfaces on the spokes or bars upon which the antifriction-rollers bear is facilitated, said surfaces being simply bored out by an ordinary boring-bar instead of being milled, this form of cage also giving increased bearing-surface for the rollers on the casing. This cage is constructed of suitable metal in one piece for any even number of rollers, each pair of bars or spokes of said cage or cradle, between which the antifriction-rollers are placed, being connected together only at one end, the other end being open for the insertion of the rollers, or, in other words, taking, as an example, a cage for eight rollers, and consequently having eight spokes, if the connections between the pairs of spokes Nos. 1 and 2, 3 and 4, 5 and 6, and 7 and 8 were at the right-hand end of the cage the connections between the pairs of spokes Nos. 1 and 8, 2 and 3, 4 and 5, and 6 and 7 would then be at the left-hand end of the cage. Briefly, an opening is left at alternately opposite ends of each two bars or spokes, between which a roller is placed. Bearing-surfaces for the antifriction-rollers are formed on the spokes or bars of the cage at each end, and projections are formed on the inner surface of the end connecting-piece of each pair of spokes as bearings for the ends of said rollers. Projecting circular ribs are formed on the inner surfaces of the ends of the casing as bearing-surfaces for the ends of the cradle and rollers, taking up lateral movement of the cradle and rollers in the casing. This cage is preferably so devised that the rollers are inserted between the spokes or bars of the cradle from the ends thereof by slipping them in between said spokes in a lateral direction, although, if desired, it may be so devised that they may be dropped in between the spokes or bars from the outside of the cradle or cage in a radial direction before the cradle is placed in the casing of the bearing; but on being so placed the rollers and cradle are retained in their proper positions, or, as an alternative, the cradle or cage may be constructed so that the rollers can be inserted from the inside of the cradle, in which alternative the rollers and cradle are retained in their proper relative positions after the shaft is inserted.

I will now describe my improved form of cradle, whereby the bearing may be more readily placed around a shaft in cases where it could not be placed in position by threading it on from the end of the shaft. In a bearing according to this portion of my invention the antifriction-rollers are controlled and kept in accurate positions both longitudinally and diametrically and with their axes parallel to the axis of the journal by my improved floating cage, which is made in two pieces, so arranged that when in position they cannot separate diametrically, this result being obtained by forming male dovetails on the end disks or shrouds of one half of the cage or cradle, which engage female dovetails on the end disks or shrouds of the other half. The two halves of the cage are prevented from separating longitudinally as between themselves by projecting rubbing-surfaces, provided upon the outer faces of the end disks or shrouds of the cage and on the casing of the bearing. The spokes or bars of this form of cage are also either arranged so that the rollers can be placed in position between them from the outside of the cage or from the inside.

In order that my improvements may be better understood and more readily carried into effect, I will describe them with reference to the accompanying drawings, in which—

Figure 2:
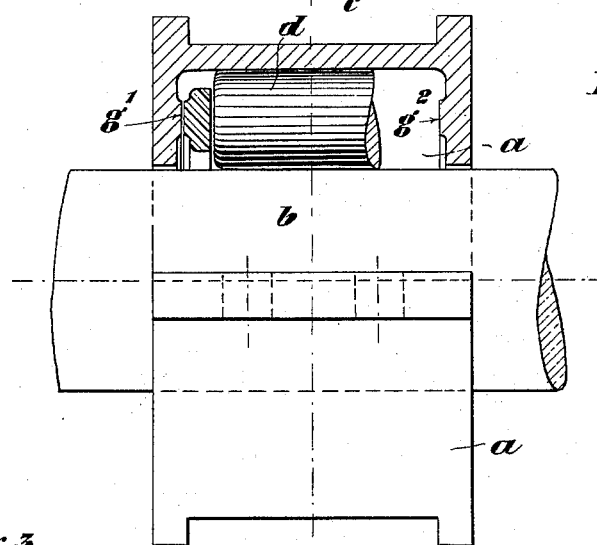
Figure 3:
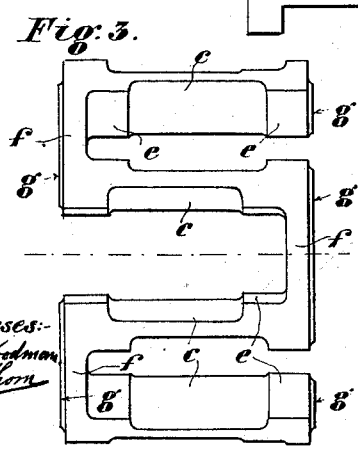
Figure 4:
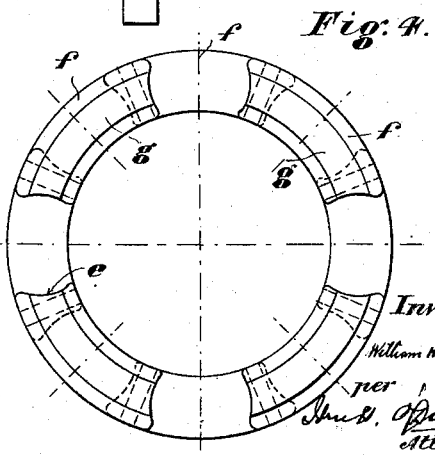
Figure 5:
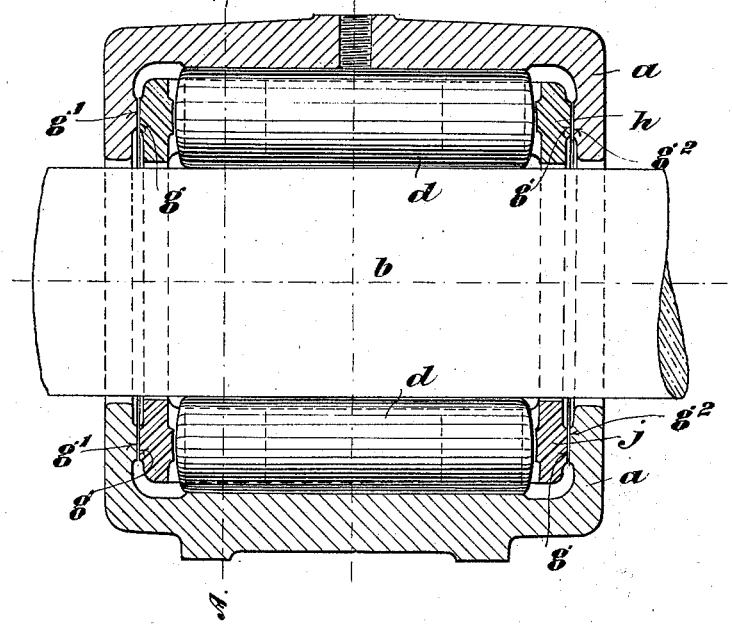
Figure 6:
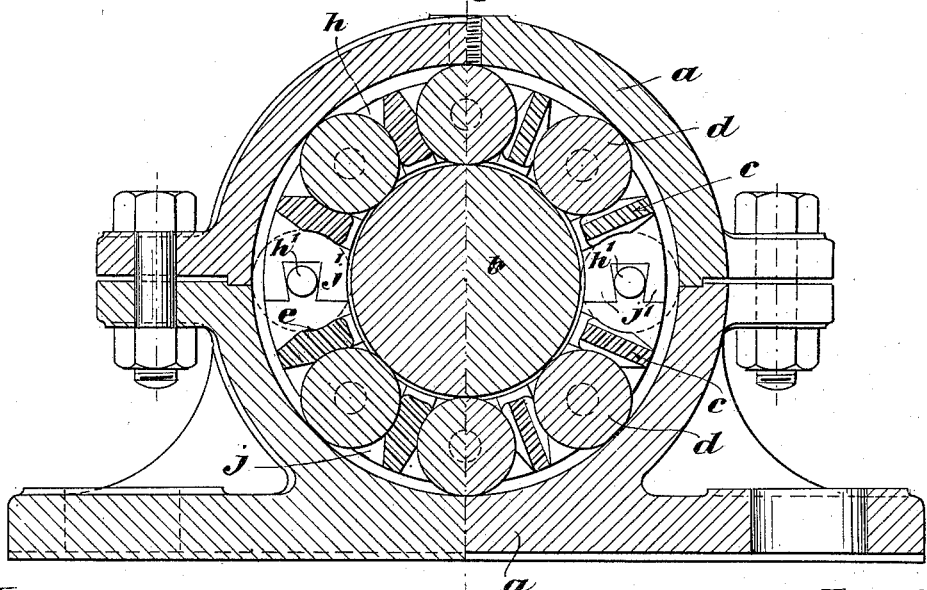
Figure 7:
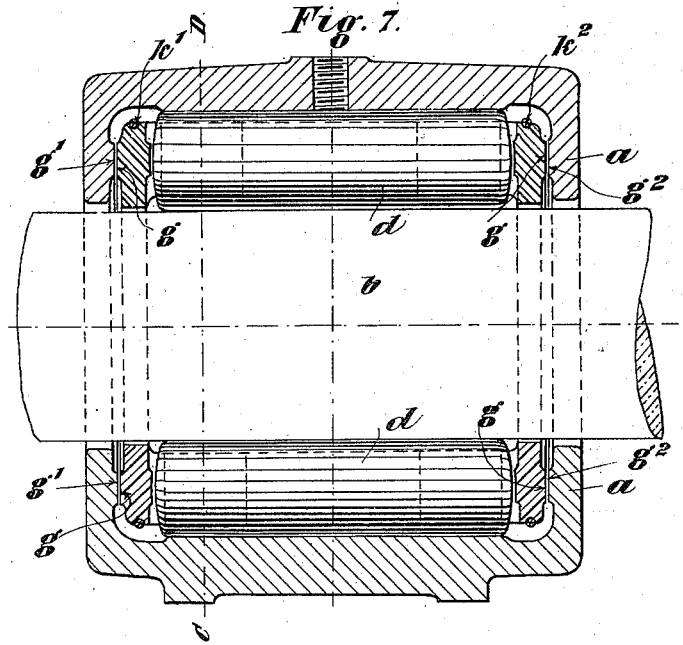
Figure 8:
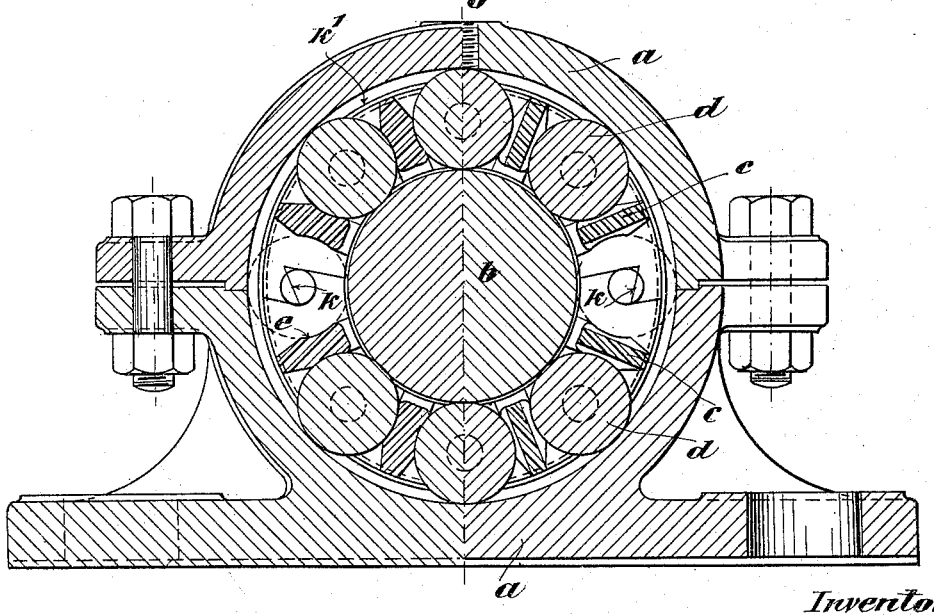

Figure 1 is a cross-section of a bearing comprising my first-mentioned improved form of cage or cradle. Fig. 2 is on the upper half a longitudinal section and on the lower side an elevation outside the casing. Fig. 3 is a side elevation of the cage without the rollers and removed from the journal box or casing, and Fig. 4 is an end view of same. Fig. 5 is a longitudinal section of a bearing comprising my second-mentioned divided cage or cradle. Fig. 6 is on the left half a cross-section on line A B, Fig. 5, and on the right half a cross-section on center line. In this figure two rollers are removed, so as to allow of the jointing of the cage being clearly shown. Fig. 7 is a cross-section of a bearing comprising a modified form of my divided cage or cradle. Fig. 8 is on the left half a cross-section on line C D, Fig. 7, and on the right half a cross-section on center line. In this figure, as in Fig. 6, two rollers are removed, so as to allow of the jointing of the cage being clearly shown.

The same letters of reference indicate similar parts in the several figures of the drawings.

Referring to Figs. 1 to 4, which illustrate my first-mentioned improvement, $a$ is the casing of the bearing. $b$ is the journal or shaft. $c$ are the spokes or bars of the cradle, between which the rollers $d$ are placed, said rollers bearing on the interior of the casing $a$ and on the journal or axle $b$, and at their ends on projecting bearing-surfaces $e$, formed on each spoke or bar $c$. $f$ are the pieces connecting the spokes or bars of the cage, said connections being at alternatively opposite ends of the bars, as clearly shown in Fig. 3, forming, as it were, a zigzag cage. $g$, Figs. 2 and 3, are the projecting bearing-surfaces formed on the outside of the end connecting-pieces $f$ of the spokes or bars $c$, said surfaces $g$ bearing on corresponding projecting circular ribs $g'$ and $g^2$, (see Fig. 2,) formed on the interior of the casing $a$.

In Figs. 5 and 6, which illustrate my second-mentioned improvement—namely, the divided cage—$h$ is the upper half of the cage and $j$ the lower half, said parts being held together against separation in a radial direction by means of male and female dovetails $h'$ $j'$, as shown in Fig. 6, two of the rollers being removed to show this joint. The remaining parts in these figures are lettered to correspond with the same or equivalent parts in the preceding figures.

In Figs. 7 and 8 a modification of the form of joint between the two portions of the divided cage is shown at $k$. In this arrangement a ring or band, preferably of steel wire, is placed around each end portion of the divided cage to better hold the two portions together, said rings (marked $k'$ $k^2$ in Fig. 7) fit in grooves in the end of the cage and are tightened by twisting the ends of the wire together. The remaining parts are lettered to correspond with similar parts in the preceding figures.

As before mentioned, my divided cage, as illustrated in Figs. 5 to 8, inclusive, is applicable to all cases where it would be impossible to place the bearing in position by threading or slipping it on from the end of the shaft. With my invention one half of the cage is first placed around the journal in a diametrical direction, the other half being similarly placed, but a little to one side of the first. The two halves are then slipped along the journal or axle toward each other until the male dovetails or projections on the end disks or shrouds of one half engage the corresponding female dovetails or recesses in the end disks or shrouds of the other half, the two halves being thus locked together against diametrical separation.

Having fully described my invention, what I claim, and desire to secure by Letters Patent, is—

1. In a roller-bearing, the combination, with a casing; of a cage provided with longitudinal bars and openings in its end portions between said bars, some of said openings being at one end and others at the other end of the cage; and rollers bearing against the said bars and the casing, substantially as set forth.

2. In a roller-bearing, the combination, with a casing; of a cage provided with longitudinal bars and openings in its end portions between the said bars, said openings being arranged alternately, one half of them at one end and the remainder at the other end of the cage; and rollers bearing against the said bars and casing, substantially as set forth.

3. In a roller-bearing, the combination, with a casing; of a cage provided with longitudinal bars and openings in one of its end portions between certain of the said bars, said bars having opposed projections $e$ on their sides at each end of the cage; and rollers bearing against the said projections and the casing, substantially as set forth.

4. In a roller-bearing, the combination, with a casing; of a longitudinally-divided cage provided with means for connecting its parts together, and having longitudinal bars, and openings in its end portions between said bars, certain of said openings being at one end and the remainder at the other end of the cage; and rollers bearing against the said bars and the casing, substantially as set forth.

WILLIAM HUGH WOODCOCK.

Witnesses:
WILLIAM H. LEWES,
WILLIAM J. THORN.